3,841,731

United States Patent
Midwinter

[11] 3,841,731
[45] Oct. 15, 1974

[54] IMPROVEMENTS IN OR RELATING TO LIQUID CORE DIELECTRIC WAVEGUIDES

[75] Inventor: John E. Midwinter, Woodbridge, England

[73] Assignee: The Post Office, London, England

[22] Filed: May 24, 1973

[21] Appl. No.: 363,527

[30] Foreign Application Priority Data
June 14, 1972  Great Britain..................... 27854/72

[52] U.S. Cl. ...... 350/96 WG, 350/96 R, 350/160 R
[51] Int. Cl. ............................................. G02b 5/14
[58] Field of Search ................................ 350/96 WG

[56] References Cited
UNITED STATES PATENTS

| | | | |
|---|---|---|---|
| 3,311,845 | 3/1967 | Koester | 350/96 WG UX |
| 3,386,787 | 6/1968 | Kaplan | 350/96 WG |
| 3,537,020 | 10/1970 | Anderson | 350/96 WG UX |

OTHER PUBLICATIONS
Stone "Optical Transmission in Liquid Core Fibers", Applied Physics Letters, Vol. 20, No. 7, April, 1972, pp. 239, 240.

*Primary Examiner*—John K. Corbin
*Attorney, Agent, or Firm*—Kemon, Palmer and Estabrook

[57]     ABSTRACT

The number of modes progagating as guided modes along a dielectric optical waveguide depends on the refractive index difference between core and cladding materials. By altering this difference the number of modes which are permitted to propagate may be controlled. For a liquid cored dielectric optical waveguide, the differnce between core and cladding refractive indices may be controlled by controlling the temperature of the dielectric optical waveguide.

2 Claims, 2 Drawing Figures ial parameter X, the refractive indices
IMPROVEMENTS IN OR RELATING TO LIQUID CORE DIELECTRIC WAVEGUIDES The invention relates to a method of, and apparatus for, controlling the bandwidth of dielectric optical waveguides, by limiting the number of modes of propagation.

In the following disclosure the term "optical waveguide" is to be understood as including dielectric waveguides propagating electromagnetic energy in the ultraviolet, visible, and infra-red regions of the spectrum.

The use of multi-mode guides for communications suffers from one obvious limitation, namely that imposed by the differential delay dispersion between modes. It is known to impose an upper limit on the number of modes propagating in a dielectric optical waveguide by a suitable choice of materials and dimensions. This may be used to provide a fixed mode filter by which the effect of mode dispersion may be reduced. The present invention seeks to describe a method by which the effect of differential delay dispersion may be both controlled and varied.

The number of modes propagating in a dielectric optical waveguide is related to the difference between the squares of the refractive index of the cladding and core materials. Further the refractive indices are functions of temperature. Thus if the temperature coefficients for the refractive indices of the core and sheath materials differ substantially, the number of modes of propagation can be controlled by controlling the temperature of the optical waveguide.

It is an object of the present invention to provide a method of and apparatus for limiting the number of modes propagating in a length of multi-mode dielectric optical waveguide.

Another object of the present invention is to provide a method of and apparatus for controlling the increase of pulsewidth induced in radiation propagating in a dielectric optical waveguide by mode dispersion.

According to the present invention, in an optical transmission system in which radiation having a finite bandwidth propagates along a dielectric optical waveguide in a number of different modes, said dielectric optical waveguide having core and cladding materials with refractive indices dependent on a physical parameter X, the refractive indices of said core and cladding material have substantially different rates of variation with X, and a portion of said dielectric optical waveguide having a value of X which can be varied; a method of limiting the number of modes of propagation including the steps of:

a. defining a number of contiguous ranges of X for said portion of dielectric optical waveguide, each range of X being chosen so that as the value of X for said portion of dielectric optical waveguide changes from one range of X to an immediately adjacent range of X, a mode, characteristic of said one range of X ceases to propagate as a guided mode in said portion of dielectric optical waveguide, b. controlling the value of X for said portion of dielectric optical waveguide to lie within one of said contiguous ranges of X.

According to a second aspect of the invention there is provided, a mode limiter comprising a portion of dielectric optical waveguide in which radiation having a finite bandwidth propagates in a number of different modes, said dielectric optical waveguide having core and cladding materials with refractive indices dependent on a physical parameter X, the refractive indices of said core and cladding material having substantially different rates of variation with X, said portion of dielectric optical waveguide having a value of X which can be varied, and means for controlling said value of X to lie within one of a number of predetermined contiguous ranges of X, each range of X being so defined that as the said value of X changes from one range of X to an immediately adjacent range of X, a mode characteristic of said one range of X ceases to propagate as a guided mode in said portion of dielectric optical waveguide.

An embodiment of the invention will now be described with reference to the accompanying diagrammatic drawings in which.

The number of modes propagating in a multi-mode guide is given approximately by $V^2/2$ where $V$ is the value of the well known expression $$V = [2\pi a/\lambda] \cdot (n_1^2 - n_2^2)^{1/2}$$

Where $n_1$ is the core refractive index, and $n_2$ is the cladding refractive index and $N \approx V^2/2$ where $N$ is the number of modes. The radius of the core is $a$.

Now since $n_1 \approx n_2$ and since the core index, $n_1$ is a sensitive function of temperature we can write:

$$n_1 = n_2 + dn_2/dT \cdot (T_0 - T)$$

where $T_o$ is simply the temperature at which the core index equals that of the cladding (silica).

It now follows directly that the number of propagating modes is a linear function of temperature, since neglecting the products of small terms $$V = [2\pi a/\lambda] \cdot [2n_2 \cdot dn_2/dT \cdot (T_0 - T)]^{1/2}$$

$$N = [2\pi^2 a^2/\lambda_0^2] \cdot [2n_2 \cdot dn_2/dT \cdot (T_0 - T)]$$

At any point in the guide, the number of propagating modes can now be limited to any chosen value simply by heating a short length. For a guide having a total loss of 8 dB/Km, the intermode coupling must be very small over distances of the order of 1 Km, so that a single mode trimmer should effectively set the number of modes carrying the energy for the whole length.

Figure 1:
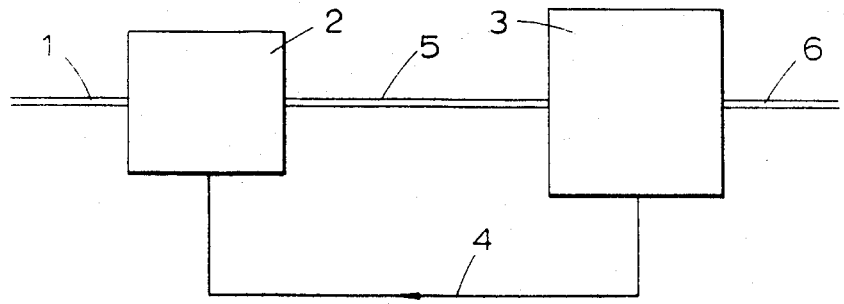
FIG. 1 shows diagrammatically an apparatus for controlling the bandwidth of a dielectric optical waveguide system.

Referring now to FIG. 1, which shows a system in which the bandwidth of an optical waveguide is controlled by heating a section of the optical waveguide; suitable electro-magnetic radiation passes down optical waveguides 1, and through a control section 2, passing down optical waveguide 5, to repeater unit 3, and leaves the system by a third section of optical waveguide 6. The control unit 2 may comprise a portion of optical waveguide which may be the same as or different from the section of optical waveguide 1, 5 and 6. The section of optical waveguide in the unit 2 is a liquid core waveguide in which the temperature coefficient of the refractive indices of the core and cladding materials is substantially different. This section of optical waveguide may be heated by some means. The electromagnetic radiation passes from the unit 2, along optical waveguide 5 to a repeater unit 3. The repeater unit 3 includes a device for measuring the bandwidth of the electro-magnetic radiation received, and produces an error signal between a desired bandwidth and the measured bandwidth. This error signal is fed along line 4 to the control unit 2, to vary the temperature of the sensitive portion of the optical waveguide.

The control section, or trimmer, 2 allows the repeater to easily control the number of incoming modes to which it is sensitive. This in turn controls the incoming bandwidth.

In an alternative system, the control path from the repeater 3 to the trimmer 2 may be dispensed with. In such a system the temperature of the sensitive waveguide in the trimmer unit 2 may be controlled by an independent temperature controller. Typically the temperature controller must be capable of controlling the temperature of the sensitive optical waveguide to within 0.1° to 0.01°C. The sensitive section of liquid core waveguide in the trimmer unit 2, consists of a silica tube with a 15 micron diameter bore filled with carbon tetra-chloride. It should be understood that other cladding and core materials and dimensions could be equally effectively used in the sensitive section of waveguide. The waveguide may be of other than circular section.

The energy from the trimmed modes is of course lost. The efficiency of the device in a given system will depend upon the efficiency with which low loss modes can be selectively excited in the initial launching process, and also on the gain in total launched energy from a given source as the number of modes is increased.

Figure 2:
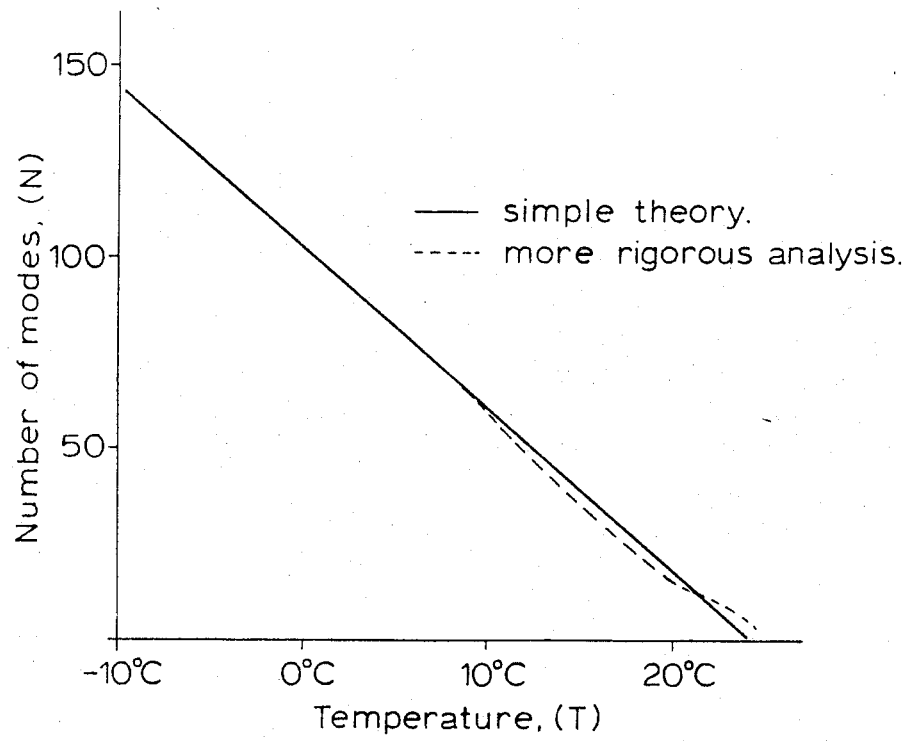
FIG. 2 shows a graph in which the number of modes propagated is plotted against temperature for a liquid core optical guide having a cladding of silica, and a core of carbon tetra-chloride.

FIG. 2 shows the relationship between temperature and the number of modes, $N$. The straight line gives the relationship derived from the simple theory described above. The curved line is the result of a more rigorous analysis. From the graph it can be seen that there is substantially no difference between the theory quoted in the specification and the more rigorous analysis, except for small values of $N$.

Although in the preferred embodiment the difference in refractive index between core and cladding materials is controlled by varying the temperature of the dielectric optical waveguide, other physical parameters to which refractive index is sensitive could also be used. Further the invention is not intended to be limited to liquid cored dielectric optical waveguides.

What is claimed is:

1. In an optical transmission system in which radiation having a finite band width propagates along a dielectric optical waveguide in a number of different modes, said dielectric optical waveguide having a liquid core and solid cladding materials with refractive indices dependent on temperature, the refractive indices of said core and cladding material having substantially different rates of variations with temperature, and a portion of said dielectric optical waveguide having a means to vary its temperature, a method of limiting the number of modes of propagation through the waveguide including the steps of:

a. defining a number of contiguous ranges of temperature for said portion of dielectric optical waveguide, each range of temperature being chosen so that as the value of temperature for said portion of dielectric optical waveguide changes from one range of temperature to an immediately adjacent range of temperature, a mode, characteristic of said one range of temperature ceases to propagate as a guided mode in said portion of dielectric optical waveguide; and controlling the value of temperature for said portion of dielectric optical waveguide to lie within one of said contiguous ranges of temperature.

2. A mode limiter comprising a portion of dielectric optical waveguide in which radiation having a finite band width propagates in a number of different modes, said dielectric optical waveguide having a liquid core and solid cladding material with refractive indices dependent upon temperature, the refractive indices of said core and cladding material having substantially different rates of variation in temperature, said portion of dielectric optical waveguide having a value of temperature which can be varied, and means for controlling said value of temperature to lie within one of a number of predetermined contiguous ranges of temperature, each range of temperature being so defined that as the value of temperature changes from one range to an immediately adjacent range, a mode characteristic of said one range ceases to propagate as a guided mode in said portion of dielectric optical waveguide.

* * * * *